April 26, 1938. R. I. WOLF 2,115,438
HYDRAULIC BRAKE SYSTEM
Filed Oct. 8, 1935
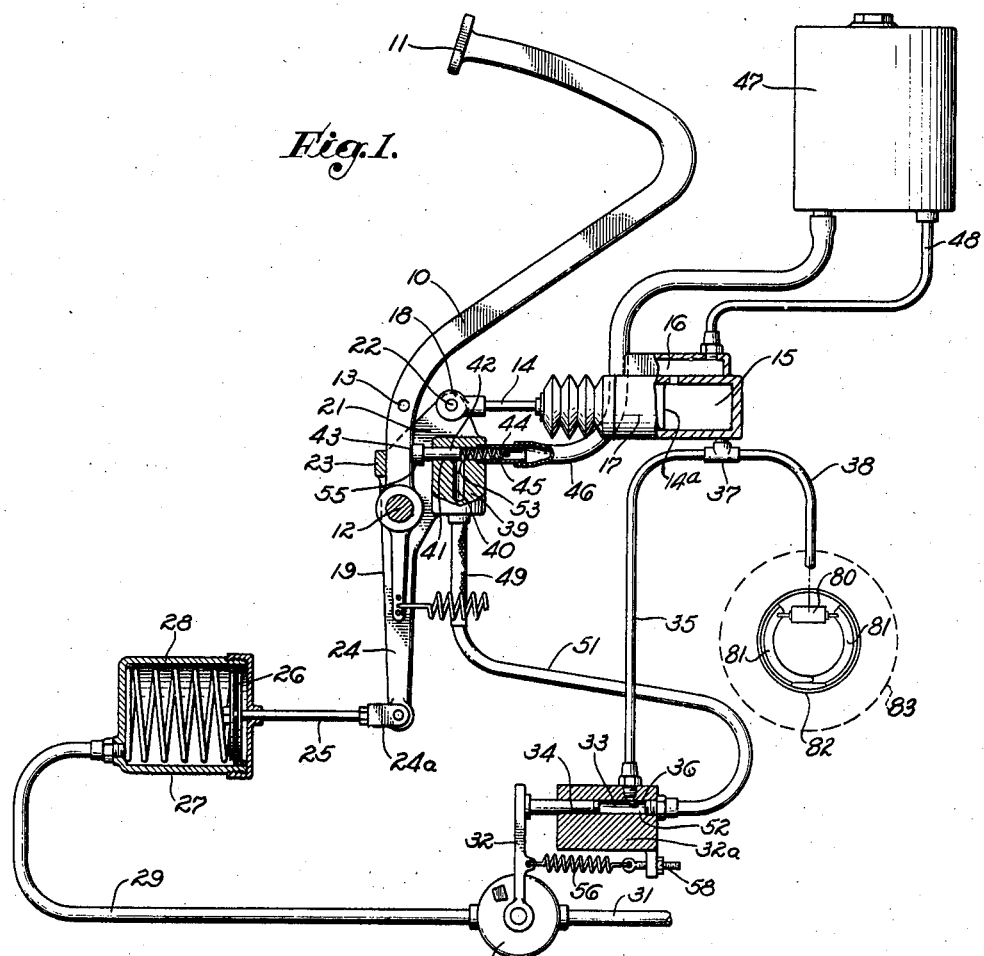
INVENTOR
ROBERT I. WOLF
BY
ATTORNEY.

UNITED STATES PATENT OFFICE 2,115,438

HYDRAULIC BRAKE SYSTEM

Robert I. Wolf, Los Angeles, Calif., assignor of fifty-one percent to E. L. Gelwicks, Los Angeles, Calif.

Application October 8, 1935, Serial No. 44,020

23 Claims. (Cl. 188—152)

My invention relates to hydraulic brake actuating means such as used on automotive vehicles wherein the brake pedal operates the piston in a pressure cylinder so as to produce a fluid pressure which is transmitted to cylinder-piston devices placed at each of the brakes to move the brake bands or shoes into engagement with the brake drums.

It is an object of the invention to provide a means which will operate in conjunction with a hydraulic brake system to operate or control a vacuum booster or other auxiliary equipment. At the present time vacuum boosters are more or less extensively used in connection with mechanically operated brakes, and to my knowledge attempts have been made to connect booster control means to hydraulic brake systems in a manner similar to that used with mechanical brakes. My present invention accomplishes control of auxiliary braking means in a satisfactory and practical manner without a jerking action of the brakes or oscillation of the foot pedal of the brake system.

It is a further object of the invention to provide a simple means for connection to hydraulic brake systems which will control the brakes of a trailing or other vehicle connected to the vehicle carrying the operator.

A further object of the invention is to provide an improved control means for the brakes of a trailing vehicle which will operate in a specified time relation to the application of the brakes of the main vehicle, so that when the brakes are applied, the trailing vehicle will not drive or thrust against the rear end of the pulling vehicle.

It is a further object of the invention to provide a simple means in conjunction with a hydraulic brake system which will keep the ducts of the system constantly full of liquid and free of accumulations of air or gas pockets.

It is a further object of the invention to provide a control means for a booster, wherein the booster will be actuated in consequence of the forward movement of a brake pedal or lever and will be gradually released as the pedal or lever is moved rearwardly.

It is a further object of my invention to provide a brake mechanism that, when once set in operation either to apply or release the brakes, will operate in an automatically progressive manner.

It is also an object of my invention to provide a brake mechanism that will be released by reverse movement of a control member irrespective of the point of operation at which such reversal occurs.

It is a further object of the invention to provide a control attachment which may be readily applied to existing hydraulic brake systems, without the necessity of extensive reconstruction of such existing brake systems.

Further objects and advantages of the invention will be brought out in the following part of the specification.

Referring to the drawing, which is for illustrative purposes only,

Fig. 1 is a diagrammatic view of a brake system with a preferred form of my invention applied thereto.

Fig. 2 is a view of schematic character showing my improved form of control means for use with a booster and the brake system of a trailer.

In the diagrammatic illustration, Fig. 1, I show the ordinary force exerting member employed in hydraulic brake systems for the actuation thereof, such force exerting member being shown as the conventional type of foot operated lever 10 having a foot engaging plate 11 and being ordinarily referred to as the brake pedal. In the ordinary use of this pedal in conjunction with a hydraulic brake system, it is pivoted on a shaft 12 and has an opening 13 through which connection to a thrust rod 14 is made so that the piston 14a of the cylinder-piston mechanism 15 of the hydraulic brake system may be actuated so as to force hydraulic fluid into the conduits or tubes of the system to expand the brake applying members which are of well known construction and are mounted in operative relation to the brake shoes or bands of individual wheels of the vehicle. In view of the fact that the hydraulic cylinder-piston mechanism 15 is well known to the art, it is not necessary to show the details thereof. Such cylinder-piston mechanism 15 has a reserve fluid chamber 16 formed thereon connected with the interior of the cylinder 17 of the mechanism 15 in such a manner that the liquid delivery conduits and the compression chamber of the device 15 will be kept supplied with liquid to compensate for losses of liquid from the hydraulic system.

In the application of the preferred form of my invention to an existing hydraulic brake system, the clevis 18 or other attaching means of the thrust rod 14 is disconnected from the opening 13 of the foot lever 10. An auxiliary lever 19 is then placed upon the shaft 12, or is otherwise secured in a movable or pivotal relationship to the lower part of the lever 10. In the preferred practice shown, the brake lever 10 and the auxiliary lever 19 are both pivoted on the shaft 12, and the brake lever 10 has a limited movement relative to the lever 19 as will be hereinafter described. This auxiliary lever 19 has an upper plate portion 21 to which the thrust rod 14 may be secured through the simple expedient of passing the connecting pin 22 of the clevis 18 through an opening in the upper extremity of the plate portion 21. This plate portion 21 lies adjacent the lower end of the lever 10 and has a stop 23 projecting across the rearward edge of the lower portion of the lever 10, and a block or body 39 lying adjacent the front portion of the lower extremity of the lever 10 above the pivot point of the lever 10 represented by the shaft 12. The auxiliary lever 19 has a secondary or lower extension 24 which may be connected at 24a to a connecting rod 25 of the piston 26 forming a part of a vacuum booster 27. The vacuum booster 27 has a cylinder 28 which is connected through a tubular member 29 with a control valve 30 for example of the usual three way type, which is diagrammatically shown since it may be made in several forms well known to the art of control valve construction and the control valve is connected through a tubular member 31 with a vacuum producing means such as the intake manifold of the engine of the automotive vehicle.

The vacuum control valve 30 has a suitable control member, such as indicated by a lever 32, which is disposed adjacent a fluid expanded member 32a which may be termed a fluid pressure receiving means. The member 32a has a cylinder bore 33 in which a piston 34 is slidable. This cylinder bore 33 is connected into the fluid pressure system through which the hydraulic brakes are actuated. For this purpose I have shown a tube 35 which connects with the bore 33 at 36 and has its other end connected through a T fitting 37 with the pressure outlet of the pressure producing device 15. Extending also from the T 37 I show a pipe 38 which may be connected to the hydraulic brake cylinders in the customary manner.

The body 39 carried by the auxiliary lever 19 embodies a pressure releasing means and for this purpose has a passage 40 leading into a transverse bore 41 so placed that the leftward end thereof will face the lower portion of the lever 10 so that a cylindrical valve stem 42 placed in the leftward end of the bore 41 may project into engagement with the lever 10 as shown at 43. The rightward end of the bore 41 has an extending tube 44 in which a compression spring 45 is placed, this spring 45 normally urging the stem 42 in leftward direction. The tube 44 connects through a flexible conduit 46 with a container 47 for hydraulic fluid, which container has a tube 48 connecting the lower portion thereof with the chamber 16 of the pressure producing mechanism 15 of the hydraulic brake system. The inlet end of the passage 40 connects through a flexible conduit 49 and a tube 51 with a passage 52 having connection with the cylinder bore 33 of the valve actuating device 32a.

When the foot lever 10 is in leftward position in engagement with the stop 23 as shown in Fig. 1, the stem 42 will be in such position that the rightward end thereof will leave an opening 53 communicating between the passage 40 and the bore 41 of the body 39. To apply the vehicle brakes the lever member 10 is forced rightwardly. Its first or initial rightward movement will press the stem 42 rightwardly in the bore 41 and close the upper end of the passage 40. When the head 55 of the stem 42 engages the leftward portion of the body 39, the movement of the lever 10 will be transmitted to the auxiliary lever 19 to rotate the same in clockwise direction, with the result that the thrust rod 14 of the pressure producing mechanism 15 will be moved rightwardly and cause hydraulic liquid to be forced outwardly under pressure through the T 37 into the conduit members 35 and 38, thereby causing actuation of the expansible hydraulic cylinder-piston members associated with the brake and also forcing the piston 34 of the device 32a outwardly, or leftwardly, in the bore 33. The outer end of the piston 34 is in such position that it will engage the control lever 32 of the valve 30 and rotate the same in anti-clockwise direction against the yieldable restraining force of a spring 56, thereby opening the valve 30 and connecting the suction of the intake manifold through the conduit member 29 with the interior of the vacuum booster cylinder 28. The reduction of pressure within the cylinder 28 will cause the piston 26 of the vacuum booster 27 to move leftwardly so that a leftward pull will be exerted through the rod 25 on the lower end of the lever extension 24 of the auxiliary lever 19, this resulting in the application of an additional force to the lever 19 to rotate the same in clockwise direction and increase the pressure on the fluid or liquid in the conduits 35 and 38. The conduit 38 is shown connected to the brake shoe expanding cylinder 80 connecting with brake shoes 81 operating within a drum 82 secured to a vehicle wheel 83. It will be understood that for two wheel brakes the parts 80 to 83 inclusive will be used in duplicate, and where the vehicle is provided with four wheel brakes these parts will be used in quadruplicate. The force exerted by the vacuum booster 27 is supplementary to the force exerted by the foot lever 10, and accordingly the pressure on the fluid transmitted through the tube 38 to the individual hydraulic brake cylinders will be increased, and a braking force will be obtained which is greater than that which is obtainable through the simple use of a foot pedal or foot lever 10 for compression of the hydraulic liquid.

It is apparent that I provide for recurring interaction between the hydraulic system and the vacuum booster in that increase of pressure in the vacuum system causes the vacuum booster to operate to further increase the pressure, which further increase causes further action on the part of the vacuum booster, etc. It may be said that my brake mechanism is automatically progressive in operation, since initial brake applying movement of the brake pedal will initiate the recurring interactions described that will cause the brake mechanism to progress to maximum brake applying pressure. A feature of my invention, in addition to the provision for automatic progression, is that the rate of the progression, i. e. the rate at which the brakes are applied automatically when the operation of the brakes are initiated, depends upon the extent of the initial movement. A relatively slight initial movement results in a gradual application of the brakes; whereas a more extensive initial movement produces rapid brake operation.

To release the brakes, the foot lever 10 is permitted to move leftwardly. The reacting pressure exerted through the thrust rod 14 will move the auxiliary lever 19 in anti-clockwise direction until the reaction exerted through the thrust rod 14 in leftward direction is balanced by the pull exerted by the vacuum booster. At this time, then, a further leftward movement of the foot lever 10 will result in the swinging of the lower portion thereof away from the body 39 and toward the stop 23. This relative movement of the lower portion of the lever 10 relative to the body 39 will permit the stem 42 to move leftwardly and thereby open the upper end of the passage 40 so that liquid will be released into the rightward portion of the bore 41 and then through the tube 44 and the flexible conduit 46 into the container 47. In view of the fact that the passage 40 is connected through the conduit members 49 and 51 with the bore 33 which in turn connects through the tube 35 with the pressure distributing system represented by the tube 38, pressure will be released from the hydraulic brake cylinders to a further extent, and likewise the release of pressure from the end of the piston 34 will permit it to move rightwardly into the cylinder bore 33 of the member 32a so that the lever 32 of the valve 30 will move in clockwise direction to close the valve 30 for the purpose of disconnecting the intake manifold from the cylinder 28 of the vacuum booster 27. The consequent increase in pressure within the cylinder 28 of the vacuum booster 27 will permit the piston 26 and the rod 25 thereof to move rightwardly under the force of a compression spring which is preferably placed within the cylinder 28 as shown, thereby moving the auxiliary lever 19 toward its initial or inactive position.

Owing to the fact that the pressure releasing means embodied in the block 39 is mounted on the auxiliary lever 19, the pressure releasing means will follow the movement of the lever 19 leftward, with the result that by a slow leftward movement of the lever 10 a gradual release of the foot brake may be accomplished without any jerking action. Also, the arrangement of parts shown makes it possible to apply the brakes to any desired extent and then partly release the same by a partial movement of the lever 10 in leftward direction.

It will be apparent that the interaction between the hydraulic system and the vacuum booster producing progressive operation will occur in the release of the brakes as well as in the application of the brakes. Thus, a drop in pressure in the hydraulic system will permit the spring 56 to partially close the valve 30, thereby raising the pressure in the vacuum booster, the vacuum booster thereupon correspondingly causing the auxiliary lever 19 to move in a direction to further reduce the pressure of the hydraulic system, which further reduction in hydraulic pressure again affects the vacuum booster. Here again, the rate at which the brake mechanism operates progressively to release the brakes depends upon the extent of the initial reverse movement of the brake pedal. It is to be noted that the pressure applying means represented by the auxiliary lever 19 for actuating the pressure producing mechanism is operatively connected with the control member or force exerting member represented by the brake pedal 11 to follow the movements of the control member with a lag at each reversal of movement on the part of the control member whereby there is relative movement between the auxilary lever and the control member whenever such reversal of movement of the control member occurs, regardless of the point in the movement of the control member at which such reversal occurs. Since the means to relieve the hydraulic system of operative pressure, as represented by the valve 42, is operated by such relative movement, the brakes are immediately applied or released by reversal of movement of the control member, depending upon the direction of the reversal, but regardless of the point in the operation of the mechanism at which the reversal occurs.

An important feature of my invention is that there is a constant circulation of hydraulic liquid in the hydraulic distributing system. For example, it is a feature of the invention to provide a hydraulic braking system in which the pressure is applied at one point therein, for example by use of the cylinder-piston pressure device 17, and to release liquid from the distributing system at another point, as by the use of the releasing means embodied in the block 39. The result of this arrangement is that hydraulic liquid is fed into the pipes 35 and 38 by the device 15 and is gradually released through the conduit members 51 and 49. The hydraulic liquid therefore travels from the pressure producing device 15 through the passage 40 of the block 39 and the conduit 46 into the container 47. Any bubbles of gas or air contained therein will be separated from the liquid in the chamber 47. By this arrangement, which has utility also with ordinary hydraulic brakes, the liquid distributing system is kept substantially full and free from gas or air pockets at all times.

The invention also provides means for controlling the operation of brakes on a trailer or for controlling trailer brakes and a vacuum booster combined. In Fig. 2 I show the arrangement of parts to be used where the device is to control the application of brakes on a trailer and at the same time control the operation of a vacuum booster connected with the braking system of the automotive vehicle. In this practice of the invention the valve actuating member 32a is replaced by a duplex valve actuating member 60 comprising a body 61 having a bore 62, both ends of which are open. The pressure pipe 35 of Fig. 1 is connected to the central portion of the bore 62, and likewise the central portion of the bore 62 is connected through a transverse passage 63 with the conduit member 51 which leads to the pressure releasing means. In the leftward end of the bore 62 a piston 64 is placed, and in the rightward end of the bore 62 a piston 65 is placed, these pistons 64 and 65 respectively engaging the levers 32 and 66 of vacuum control valves 30 and 67. As previously explained, the valve 30 connects through a conduit 29 with the vacuum booster 27 situated on the automotive vehicle. The valve 67 has a conduit member 68 extending therefrom to the vacuum actuated mechanism associated with the brakes of a trailer. Both the valve 30 and the valve 67 are connected to the conduit 31 which is connected to the intake manifold of the engine.

The levers 32 and 66 are shown equipped with springs 70 and 71 having adjusting screws 72 and 73 associated therewith. The spring 70 is adjusted so as to exert a greater force against the lever 32 than the spring 71 exerts against the lever 66 so that when pressure is applied through the conduit 35 to the bore 62, the valve lever 66 will be moved toward its open position before the valve lever 32. Accordingly, a condition of partial vacuum will be transmitted through the conduit 68 to the vacuum responsive brake mechanism of the trailer before the vacuum booster 27 of the automotive vehicle is operated, with the result that the brakes of the trailer will be applied just before the vacuum booster 27 comes into operation, the purpose of this being to keep the trailer from tending to drive against the back of the automotive vehicle as would occur where the brakes of the automotive vehicle were applied before the brakes of the trailer. The spring 56 associated with the lever 32 has an adjustment nut 58 associated therewith so that the movement of the valve lever 32 under force exerted by the piston 34 may be in any desired relation to the operation of the hydraulic brake mechanism of the pulling vehicle.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A hydraulic brake system of the character described, including: a pressure applying means; a force exerting means moving in forward direction to apply an actuating force to said pressure applying means and moving in rearward direction to release said force from said pressure applying means; a pressure operated member; distributing means forming a passage connecting said pressure applying means with said pressure operated member, said pressure applying means being in continuously open connection with said passage; and a pressure releaser connected to said force exerting means so as to be actuated thereby and having a valve connected to said passage at a point remote from said pressure applying means and operating to release liquid from said passage to relieve said pressure operated member of operating pressure when said force exerting means is moved in said rearward direction.

2. A hydraulic brake system of the character described, including: a pressure applying means; a force exerting means moving in forward direction to apply an actuating force to said pressure applying means and moving in rearward direction to release said force from said pressure applying means; a pressure operated member; distributing means forming a passage connecting said pressure applying means with said pressure operated member, said pressure applying means being in continuously open connection with said passage; and a pressure releaser connected to said force exerting means so as to be actuated thereby, said pressure releaser having a valve with its inlet connected to said passage at a point remote from said pressure applying means and its outlet connected to said pressure applying means and operating to release liquid from said passage in consequence of movement of said force exerting means in said rearward direction, thereby relieving said pressure operated member of operative pressure.

3. A hydraulic brake system of the character described, including: a hydraulically actuated brake associated with a wheel of a vehicle; conduit means connected to said hydraulically actuated brake for the delivery of liquid under pressure thereto; variable pressure applying means in continuously open communication with said conduit means operative to apply pressure to one point in said conduit means; and means for releasing the pressure in said conduit means at another point therein, thereby to release said brake.

4. A hydraulic brake system of the character described, including: a hydraulically actuated brake associated with a wheel of a vehicle; conduit means connected to said hydraulically actuated brake for the delivery of liquid under pressure thereto; variable pressure applying means in continuously open communication with said conduit means operative to apply liquid under pressure to one point in said conduit means whereby to cause actuation of said hydraulically actuated brake; and means for releasing liquid from another point in said conduit means to release said brake and returning the released liquid to said means operative to apply liquid under pressure.

5. A brake system of the character described, including: a contractile chamber member for a liquid to be placed under pressure; a brake lever connected to said chamber member so as to contract the same; a pressure receiving device having a part moved by liquid pressure; means forming a passage connecting said member to said device; force exerting means controlled by said movable part of said pressure receiving device for applying a booster force to said contractile member to contract the same; and means operating independently of said contractile member to release the liquid pressure applied to said pressure receiving device.

6. A hydraulic controlling device of the character described for use with a hydraulic brake system having a brake lever and pressure cylinder operated by the forward movement of said brake lever, hydraulic brake actuating members associated with the wheels of a vehicle, and means forming passages transmitting liquid pressure from said cylinder to said brake actuating members, said hydraulic controlling device including: control means insertable between said brake lever and said pressure cylinder so that the forward force of said lever will be transmitted through said means to said cylinder and so that said brake lever will have a limited movement relative to said control means; and a valve member operatively connected to said control means, said valve member having a duct connected to said passage of said hydraulic brake system and operating in response to rearward movement of said brake lever to release the pressure in said passage sufficiently to relieve said brake actuating members of operative pressure.

7. A hydraulic controlling device of the character described for use with a hydraulic brake system having a brake lever and pressure cylinder operated by the forward movement of said brake lever, hydraulic brake actuating members associated with the wheels of a vehicle, and means forming passages transmitting liquid pressure from said cylinder to said brake actuating members, said hydraulic controlling device including: control means insertable between said brake lever and said pressure cylinder so that said brake lever will have a limited free movement relative to said control means and so that the forward force of said lever will be transmitted through said means to said cylinder; a booster mechanism having for the accomplishment of its control a pressure responsive device connected with said passages of said brake system; means for connecting said booster mechanism to said pressure cylinder to supplement the force applied to the same; means forming a duct connected so as to receive fluid under pressure from said passages; and a valve in said duct, said valve being connected to said control means so as to operate in response to forward movement of said brake lever to close said duct and to operate in response to rearward movement of said brake lever to open said duct.

8. A hydraulic controlling device of the character described for use with a hydraulic brake system having a brake lever and pressure cylinder operated by the forward movement of said brake lever, hydraulic brake actuating members associated with the wheels of a vehicle, and means forming passages transmitting liquid pressure from said cylinder to said brake actuating members, said hydraulic controlling device including: an auxiliary lever adapted to be connected to said cylinder in the place of said brake lever and to have a loose connection with said brake lever whereby said brake lever will have a small free movement and then transmit movement to said auxiliary lever; a booster mechanism connected to said auxiliary lever so as to move the same in forward direction, said booster mechanism having a fluid operated control means connected to said passages of said hydraulic brake system; and means operative in response to rearward movement of said brake lever relative to said auxiliary lever to release pressure from said passages.

9. A hydraulic controlling device of the character described for use with a hydraulic brake system having a brake lever and pressure cylinder operated by the forward movement of said brake lever, hydraulic brake actuating members associated with the wheels of a vehicle, and means forming passages transmitting liquid pressure from said cylinder to said brake actuating members, said hydraulic controlling device including: an auxiliary lever adapted to be connected to said cylinder in the place of said brake lever and to have a loose connection with said brake lever whereby said brake lever will have a small free movement and then transmit movement to said auxiliary lever; a booster mechanism connected to said auxiliary lever so as to move the same in forward direction, said booster mechanism having a fluid operated control means connected to said passages of said hydraulic brake system; a valve carried by said auxiliary lever so as to be closed and opened respectively by the forward and rearward movement of said brake lever relative to said auxiliary lever; and means connecting the inlet and outlet of said valve respectively to said passages and said cylinder of said hydraulic brake system.

10. A hydraulic controlling device of the character described for use with a hydraulic brake system having a brake lever and pressure cylinder operated by the forward movement of said brake lever, hydraulic brake actuating members associated with the wheels of a vehicle, and means forming passages transmitting liquid pressure from said cylinder to said brake actuating members, said hydraulic controlling device including: an auxiliary lever adapted to be connected to said cylinder in the place of said brake lever and to have a loose connection with said brake lever whereby said brake lever will have a small free movement and then transmit movement to said auxiliary lever; and a valve connected so as to be operated by the movement of said brake lever relative to said auxiliary lever.

11. A hydraulic controlling device of the character described for use with a hydraulic brake system having a brake lever and pressure cylinder operated by the forward movement of said brake lever, hydraulic brake actuating members associated with the wheels of a vehicle, and means forming passages transmitting liquid pressure from said cylinder to said brake actuating members, said hydraulic controlling device including: a booster mechanism connected to said pressure cylinder so as to exert a force auxiliary to said brake lever to operate said pressure cylinder; a fluid operated control means for said booster mechanism connected to said passages of said brake system so as to receive fluid under pressure therefrom; and means separate from said brake system operative in response to rearward movement of said brake lever to release pressure from said control means.

12. A hydraulic brake system of the character described, including: a brake lever; a cylinder means adapted to be operated by forward movement of said brake lever to place a liquid under pressure; a fluid expansible device; control means connecting said fluid expansible device to a source of fluid under pressure, said control means including a valve; hydraulic means connected to said cylinder means so as to receive liquid under pressure therefrom and to be actuated by said liquid under pressure so as to operate said valve; and releasing means comprising a release valve connected to said hydraulic means and being operated by rearward movement of said brake lever to release liquid pressure from said hydraulic means.

13. A hydraulic brake system of the character described, including: a brake lever; a cylinder means adapted to be operated by forward movement of said brake lever to place a liquid under pressure; a fluid expansible device; control means connecting said fluid expansible device to a source of fluid under pressure, said control means including a valve; hydraulic means connected to said cylinder means so as to receive liquid under pressure therefrom and to be actuated by said liquid under pressure so as to operate said valve; and releasing means comprising a release valve connected to said hydraulic means and being operated by rearward movement of said brake lever to release liquid pressure from said hydraulic means and return the released liquid to said cylinder means.

14. A hydraulic brake system of the character described, including: a brake lever; a cylinder means adapted to be operated by forward movement of said brake lever to place a liquid under pressure; a control valve; an operating means for said control valve connected to said cylinder means so as to receive liquid under pressure therefrom, said operating means being actuated by said liquid under pressure to operate said control valve; and a release valve connected to said operating means for releasing liquid under pressure from the same, said release valve being so connected to said brake lever that it will be operated by rearward movement of said brake lever.

15. A brake system of the character described, including: a brake lever; a contractile chamber member for a liquid which is to be placed under pressure; a make-up reservoir connected to said contractile chamber member; means connecting said brake lever to said contractile chamber member so that said contractile chamber member may be operated by said brake lever; an operating device having a part moved by the pressure of liquid; walls forming a passage providing an open communication between said contractile chamber member and said operating device so that liquid under pressure may flow from said contractile chamber member to said operating device when said contractile chamber member is contracted, and from said operating device to said contractile chamber member when said contractile chamber member is expanded; and means under control of said brake lever and operating independently of said contractile chamber member to release liquid from said passage intermediate said contractile chamber member and said operating device and to return the same to said reservoir.

16. A controlling device of the character described, for use with a hydraulic brake system having a cylinder-piston means or the like for delivering a variable actuating fluid pressure, including: a pair of fluid control valves; a primary fluid receiving member connected to said cylinder-piston means and having a part movable by fluid pressure from said cylinder-piston means; a secondary fluid receiving member connected to said cylinder-piston means and having a part movable by fluid pressure from said cylinder-piston means; means connecting said movable parts of said primary and secondary fluid receiving members respectively to said fluid control valves so that said fluid control valves will be operated by said movable parts; and control means operatively connected so that one of said movable parts will have later movement than the other.

17. A hydraulic controlling device of the character described, for use with a hydraulic brake system having a brake lever and a contractile chamber member operated by the forward movement of said brake lever, and means forming fluid delivery passages leading from said contractile chamber member, said hydraulic controlling device including: control means insertable between said brake lever and said contractile chamber member so that said brake lever will have limited free movement relative to said control means and so that the forward force of said lever will be transmitted through said control means to said contractile chamber member; means operative in response to fluid pressure created in said contractile chamber member to apply a supplementary contracting force to said contractile chamber member; and means operated by the reverse movement of said brake lever relative to said control means to release fluid pressure in said contractile chamber member.

18. A brake system of the character described, including: a brake lever; a contractile chamber member for a liquid which is to be placed under pressure; means connecting said brake lever to said contractile chamber member so that said contractile chamber member may be contracted by forward movement of said brake lever; an operating device having a part moved by the pressure of liquid; walls forming a passage connecting said member to said device so that liquid under pressure may be delivered from said member to said device; a supplementary pressure applying means controlled by said device so as to apply pressure to said contractile chamber member; and means operating in response to rearward movement of said brake lever to release the pressure in said contractile chamber member.

19. In a hydraulic controlling device of the character described, the combination of: a contractile chamber member for placing an actuating fluid under pressure; a control member; a pressure applying means operative by movement in one direction to contract said contractile member to place said actuating fluid under pressure, said pressure applying means being operatively connected with said control member to follow the movements thereof with a lag at each reversal of movement of said control member causing relative movement between the control member and the pressure applying means; and means to release the pressure of said actuating fluid on said actuating member, said means being associated with said control member and pressure applying means to be operated by relative movement between the control member and the pressure applying means whereby a reversal from brake applying movement of the control member will release said pressure of the actuating fluid.

20. A brake system of the class described, having in combination: a pressure producing mechanism; a force exerting member to apply an actuating force to said pressure producing mechanism; a brake operable by pressure of liquid; walls forming a passage connecting said pressure producing mechanism to said brake to transmit hydraulic pressure from the pressure producing mechanism to said brake; a vacuum booster means for applying actuating force to said pressure producing mechanism; a valve controlling said vacuum booster means; and hydraulic means responsive to pressure of fluid between said pressure producing mechanism and the brake, said hydraulic means being adapted to manipulate said valve in response to increase of pressure to cause said vacuum booster to apply actuating force to said pressure producing mechanism whereby recurring interaction between the pressure producing mechanism and the vacuum booster will cause the brake to be applied progressively.

21. In a brake controlling device of the character described, the combination of: a contractile chamber member for placing an actuating fluid under pressure; pressure applying means having a movement independent of said contractile member and being operative to contract said contractile member; an operable member connected so as to receive fluid from said contractile member to operate said operable member; and means connected to said pressure applying means so as to be actuated by said independent movement of said pressure applying means to control the operation of said operable member.

22. In a brake controlling device of the character described, the combination of: a fluid pressure producing means; a movable means for controlling said fluid pressure producing means; a control member operative to impart movement to said movable means, said control member having a movement independent of the movement of said movable means; an operable member connected so as to receive fluid for its operation from said pressure producing means; and means connected to said control member so as to be actuated in response to said independent movement of said control member to control the operation of said operable member.

23. In a hydraulic brake system of the character described, the combination of: a contractile chamber member for placing a brake operating fluid under pressure, there being a movable part connected to said contractile chamber member adapted to receive force by which said chamber member will be contracted; a pressure exerting member operative to apply a force to said movable part to move the same so as to cause contraction of said chamber member, said pressure exerting member having an independent movement relative to said movable part; a force applying means operative to apply a force to said movable part so as to cause contraction of said chamber member; and control means operative by said independent movement of said pressure exerting member to control the operation of said force applying means.

ROBERT I. WOLF.